United States Patent
Ghannam et al.

(10) Patent No.: US 9,067,553 B1
(45) Date of Patent: Jun. 30, 2015

(54) VEHICLE FASCIA INTEGRATED PUSHERS

(71) Applicant: FORD GLOBAL TECHNOLOGIES, LLC, Dearborn, MI (US)

(72) Inventors: Mahmoud Yousef Ghannam, Canton, MI (US); Yeruva Satya Reddy, Farmington, MI (US); Abraham G. Philip, Rochester Hills, MI (US); Steven Yellin Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/298,097

(22) Filed: Jun. 6, 2014

(51) Int. Cl.
*B60R 19/18* (2006.01)
*B60R 19/48* (2006.01)
*B60R 21/0136* (2006.01)

(52) U.S. Cl.
CPC ........... *B60R 19/483* (2013.01); *B60R 21/0136* (2013.01); *B60R 19/18* (2013.01); *B60R 2019/1893* (2013.01)

(58) Field of Classification Search
CPC ...... B60R 19/18; B60R 19/20; B60R 19/483; B60R 21/34; B60R 2019/186; B60R 2019/1866; B60R 2019/1886
USPC ............. 293/102, 120, 132, 133; 296/187.03, 296/187.04, 187.09, 187.1
See application file for complete search history.

(56) References Cited

U.S. PATENT DOCUMENTS

| | | | |
|---|---|---|---|
| 6,746,061 B1 | 6/2004 | Evans | |
| 6,997,490 B2* | 2/2006 | Evans et al. | 293/120 |
| 7,163,243 B2* | 1/2007 | Evans | 293/121 |
| 7,533,912 B2* | 5/2009 | Frederick et al. | 293/120 |
| 7,625,036 B2* | 12/2009 | Cormier et al. | 296/187.03 |
| 7,686,358 B2* | 3/2010 | Takahashi et al. | 293/102 |
| 7,733,219 B2* | 6/2010 | Kamei et al. | 340/436 |
| 7,768,381 B2* | 8/2010 | Takafuji et al. | 340/436 |
| 7,881,843 B2* | 2/2011 | Murakami et al. | 701/45 |
| 7,980,606 B2* | 7/2011 | Takahashi et al. | 293/117 |
| 8,585,106 B2* | 11/2013 | Gukkenberger et al. | 293/109 |
| 8,864,196 B2* | 10/2014 | Shamoto | 293/117 |
| 2003/0020289 A1 | 1/2003 | Dohrmann et al. | |
| 2005/0046206 A1* | 3/2005 | Ohno et al. | 293/120 |
| 2009/0021030 A1* | 1/2009 | Tanabe | 293/117 |
| 2009/0050395 A1* | 2/2009 | Hosokawa et al. | 180/274 |
| 2014/0265445 A1* | 9/2014 | Leach | 296/187.04 |
| 2014/0312636 A1* | 10/2014 | Corwin et al. | 293/133 |

FOREIGN PATENT DOCUMENTS

| | | |
|---|---|---|
| DE | 102010000224 A1 | 8/2010 |
| DE | 102011055776 A1 | 6/2012 |

OTHER PUBLICATIONS

Fredriksson, Rikard, et al., "Evaluation of a New Pedestrian Head Injury Protection System With a Sensor in the Bumper and Lifting of the Bonnet's Rear Part", Paper No. 131, 12 pages, Society of Automotive Engineers, 2001.

* cited by examiner

*Primary Examiner* — Gregory Blankenship
(74) *Attorney, Agent, or Firm* — Frank A. MacKenzie; Brooks Kushman P.C.

(57) ABSTRACT

A vehicle includes a fascia, a bumper beam, and a sensor including a pressure chamber disposed between and along the fascia and bumper beam. The vehicle further includes a plurality of pusher blocks disposed between and along the fascia and bumper beam. The pusher blocks impinge upon the pressure chamber during fascia impact. Contact areas defined by the pusher blocks decrease toward a center of the pressure chamber and increase toward ends of the pressure chamber.

17 Claims, 3 Drawing Sheets

VEHICLE FASCIA INTEGRATED PUSHERS

TECHNICAL FIELD

The present application relates to vehicle fasciae.

BACKGROUND

During an impact with vehicle fascia, the perpendicular component of the impact force is translated into the fascia. This perpendicular component is greater when the impact occurs at a center of the fascia as compared with an impact near a side of the fascia. For accurate classification and deployment of protection measures, at least one pressure tube and a plurality of sensors may be disposed between the fascia and corresponding bumper to assist control logic in making decisions.

SUMMARY

A vehicle includes a bumper structure including a fascia, a beam, a sensor disposed between the fascia and beam and defining a pressure cavity along the fascia, and a plurality of pushers disposed between the fascia and sensor. The pushers are configured such that, for a given vehicle speed, an impact with the bumper structure near a center of the fascia causes a pressure increase within the pressure cavity approximately equal to an impact with the bumper structure near an end of the fascia.

A vehicle includes a fascia, a bumper beam, a sensor including a pressure chamber disposed between and along the fascia and bumper beam, and a plurality of pushers disposed between and along the fascia and bumper beam. The pushers are configured to impinge upon the pressure chamber during fascia impact. Contact areas defined by the pushers decrease toward a center of the pressure chamber and increase toward ends of the pressure chamber.

A vehicle includes a fascia having a curvature, a pressure sensor coupled with a chamber disposed behind the fascia, and a plurality of pushers, having different contact areas, attached along the curvature. The contact areas complement the curvature such that, for a given vehicle speed, an impact near a center of the fascia causes a pressure increase within the chamber approximately equal to an impact near an end of the fascia.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
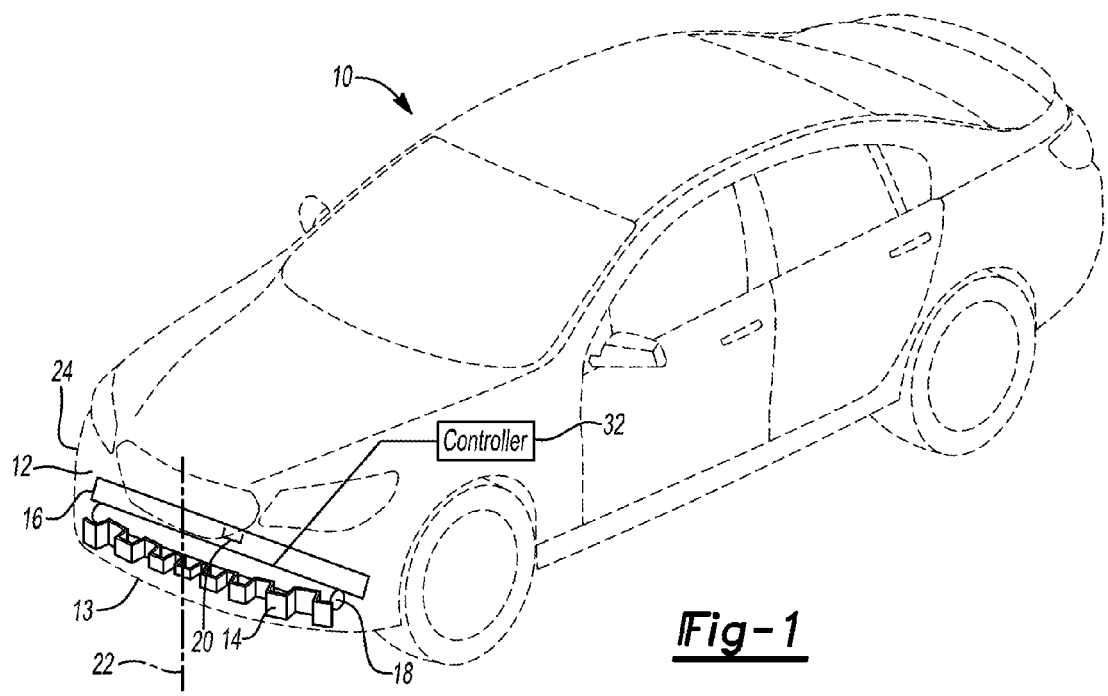
FIG. 1 is a perspective view of a vehicle.

Referring to FIG. 1, a vehicle 10 having a fascia 12 with a plurality of pusher blocks 14 is shown. The blocks 14 may be disposed behind the fascia 12. A pressure tube 18 may be disposed between a bumper 16 and the blocks 14. The pressure tube 18 includes a pressure sensor 20 to monitor a change in pressure within the tube 18 during an impact event. The pressure sensor 20 may be located at the center of the pressure tube 18.

When a vehicle 10 is impacted, the fascia 12 impacts the pressure tube 18 before impacting the bumper 16. This causes a change in volume of the pressure tube 18. The change in volume within the pressure tube 18 indicates, to the pressure sensor 20, an impact. The pressure sensor 20, after an impact, sends a pressure signal to a controller 32 indicating the impact characteristics. These include the change in volume of the pressure tube 18, a magnitude of the impact force, and a length of time of the impact. The controller 32 uses the impact characteristics to determine deployment of protection measures. If the impact characteristics are above a threshold condition, then the controller 32 deploys the protection measures.

The fascia 12 has a curvature 13 such that a perpendicular component of the impact force has a different effective magnitude depending on the impact location. The effective magnitude of the impact force decreases as the impact occurs further from a center 22 of the vehicle 10. For example, an impact with a center 22 of the vehicle 10 will have a greater effective magnitude than the same impact on a side 24 of the vehicle 10. The differing effective magnitudes of the same impact results in different volume changes in the pressure tube 18 for the same impact. This results in two different pressure signals from the pressure sensor 20 for the same impact.

A different change in pressure within the tube 18 for the same impact may result in the controller 32 not deploying a protection measure for a side impact and deploying a protection measure for a center impact. In order to compensate for the differences between similar impacts at different locations additional components may be needed. For example, at least one pressure tube 18 having a plurality of pressure sensors 20 may further help compensate for the difference. This requires the use of various systems to determine appropriate protection deployment threshold conditions for the same impact event.

Examples disclosed herein may attempt to equalize the pressure change within the tube 18 regardless of the impact location for similar impact events. Pressure may be determined by dividing the impact force over the area impacting the pressure tube 18. Knowing the curvature 13 of the front fascia 12 allows for a determination of the impact force at various locations on the fascia 12. Therefore, certain examples adapt a geometric ratio of the block area to account for the differing impact forces of the differing fascia locations. This equalizes the volume change in the tube 18, regardless of the impact location, by changing the area of the block 14 based on the magnitude of the impact force at that location.

Adapting the geometric ratio of the blocks 14 based on the curvature 13 of the fascia 12 allows a single pressure sensor 20 to be disposed on a single pressure tube 18. This allows the pressure sensor 20 to send a more accurate signal to the controller 32. A more accurate identification of the volume change, and as such the pressure change, further allows the controller 32 to more quickly classify the impact and deploy a protection measure. The controller 32 may deploy a protection measure if the magnitude of the impact is above a threshold.

Figure 2:
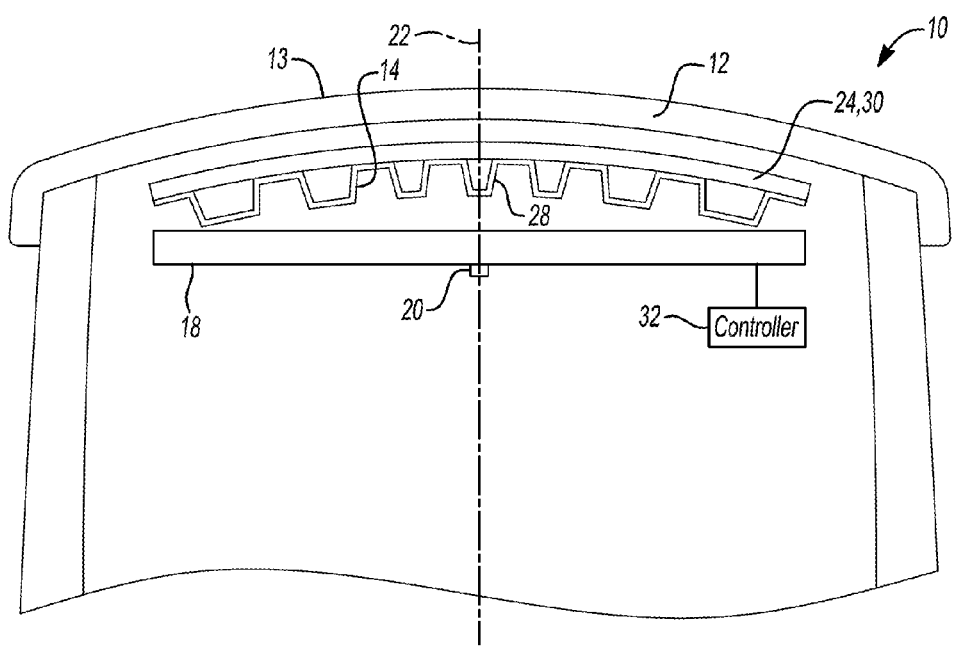
FIG. 2 is a plan view of vehicle fascia formed with pushers disposed between the fascia and corresponding bumper beam.

Referring to FIG. 2, a view of the fascia 12 having pusher blocks 14 is shown. The blocks 14 are shown attached to the fascia 12. The blocks 14 may also be disposed on the bumper 16. Attached to the fascia 12, the blocks 14 are disposed in a way such that, upon an impact, they indent the pressure tube 18. The geometric ratio of the blocks 14 impact the size of the indent on the pressure tube 18. The size of the indent on the pressure tube 18 impacts the fluid flow within the pressure tube 18. Therefore, adaptation of geometric ratios of the blocks 14 based on the impact location helps to control the fluid flow within the tube 18. This allows for equalization of the pressure within the tube 18 at the pressure sensor 20 despite differing impact forces at various locations on the fascia 12. The block geometry depends on the location of the block 14 on the fascia 12.

As stated above, the fascia 12 has a known curvature 13. This allows for determination of the effective impact force component at each location of the fascia 12. This also allows for optimization of the block geometry. For example, a block 14 at a high impact area 26, such as the center 22 of the vehicle 10, may have a smaller contact area 28 with the pressure tube 18. Likewise, a block 14 at a low impact area 30, such as on the side 24 of the vehicle 10, will have a larger contact area 28 with the pressure tube 18. Therefore, a high impact force near a center of the fascia 12 may cause a smaller change in volume within the tube 18. And, a low impact force near an end of the fascia 12 may cause a higher change in volume within the tube 18.

The pressure within the tube 18 is a function of the difference between the volume of the tube 18 before an impact and the volume of the tube 18 after the impact. Further, the pressure within the tube 18 depends on the force of the impact over the contact area 28 of the blocks 14 on the tube 18. Adjusting the contact area 28 of the blocks 14 allows for the difference between the volume of the tube 18 before an impact and the volume of the tube 18 after the impact to be dependent on the force of the impact.

Modifying the contact area 28 of the blocks 14 to equalize the force of an impact, regardless of the location of the impact on the fascia 12, allows for a single pressure tube 18 and a single pressure sensor 20 to be used. The pressure sensor 20 will send a single pressure signal identifying the impact characteristics to a controller 32. The controller 32 compares the pressure signal to a threshold condition and classifies the impact. This allows the controller 32, using protection control logic, to further discriminate between types of impacts. Further discriminating between impact types allows the controller 32 to deploy a protection measure using a single pressure sensor 20, if the pressure signal from the pressure sensor 20 is above the threshold condition.

Figure 3:
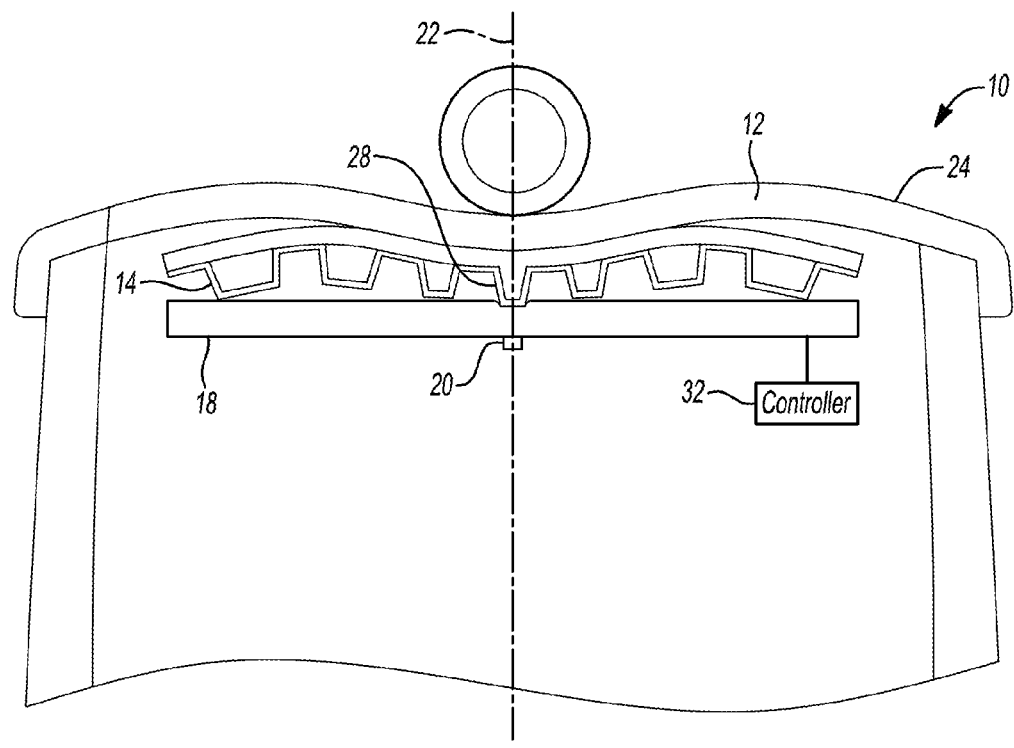
FIG. 3 is a plan view of the pushers during a center vehicle impact.

Referring to FIG. 3, a perspective view of the fascia 12 is shown being impacted at the center 22. Impacting the center 22 of the vehicle 10 displaces the fascia 12 causing the blocks 14 to indent the pressure tube 18 before impacting the bumper 16. Due to the higher impact force component, as described above, the blocks 14 disposed at the center 22 of the vehicle 10 press into the pressure tube 18 deeper than an impact at a side 24 of vehicle 10. The depth of the indent caused by the blocks 14 into the pressure tube 18 may be based on the geometry of the contact area 28 of the blocks 14.

The contact area 28 of the blocks 14 increases as the blocks 14 move away from the center 22 of the vehicle 10. This ensures that the magnitude of the impact force on the pressure tube 18 is equal despite the location of the impact on the fascia 12. For example, high impact force areas 26 have a smaller contact area 28 resulting in a longer depth indentation on the tube 18. Likewise, low force areas 30 have a larger contact area 28 resulting in a shorter depth indentation on the tube 18. The depth of the indentation caused by the blocks 14 on the pressure tube 18 decreases as the blocks 14 move away from the center 22 of the vehicle 10.

By equalizing the pressure signal characteristics throughout the fascia 12, the pressure signal allows the controller 32 to further classify the impact event. This may allow the controller 32 to respond quicker after an impact has taken place. The differing contact area 28 of the blocks 14, therefore, may reduce the response time of controller 32.

The differing contact area 28 of the blocks 14 allows a similar pressure signal to be sent to the controller 32. This is due to displacement of the fascia 12 at any impact location that forces the blocks 14 into the pressure tube 18. Despite the location of the impact on the vehicle 10, the pressure signal from the pressure sensor 20 will have the same characteristics, such as slope and magnitude, and will peak at the same time. This further allows for equalization of the signal characteristics and reduces the need for an additional pressure tube as well as the need for an additional pressure sensor.

Figure 4:
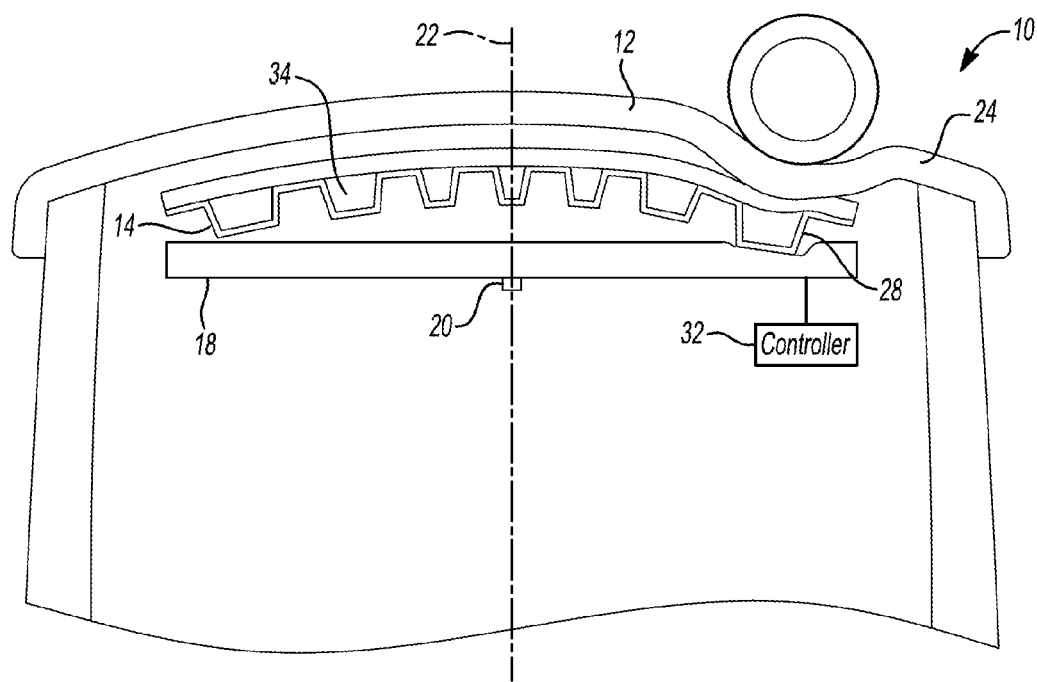
FIGS. 4 and 5 are plan views of the pushers during side vehicle impacts.

Referring to FIG. 4, a perspective view of an impact with a side 24 of the vehicle 10 is shown. As described above, the contact area 28 of the blocks 14 is related to the depth of the indentation of the pressure tube 18. The penetration of the contact area 28 into the pressure tube 18 determines the change in volume of the pressure tube 18. In order to sufficiently optimize the threshold condition, the strength of the material used to form the blocks 14 drives the shape of the contact area 28 of the block 14. Therefore, the strength of the material used to form the blocks 14 drives the change in volume within the pressure tube 18.

The strength of the material of the blocks 14 drives the geometry of the contact area 28. For example, when using a commonly soft pressure tube 18 having a minimum stiffness, different materials may impact the pressure tube 18 in different ways. A relatively rigid material, such as a rigid plastic or metallic material, may create deeper indentations in the pressure tube 18. This would result in a higher change in volume within the pressure tube 18 giving the pressure sensor 20 a higher magnitude pressure signal. Likewise, a relatively pliable material, such as rubber or any other nonmetallic material may indent the pressure tube 18 less than the rigid material. This would result in a lower change in volume within the pressure tube 18 giving the pressure sensor 20 a lower magnitude pressure signal.

The strength of the material, and as such the shape of the contact area 28, may be sufficiently optimized to allow the blocks 14 to act as an energy absorber within the vehicle 10. Disposed between the fascia 12 and the bumper 16, the blocks 14 may absorb energy displaced from the impact event. For example, the blocks 14 may be formed of a relatively rigid plastic and have a cross-section that defines a cavity 34. The cavity 34 may further be filled with energy absorbing foam, or other energy absorbing material. This may allow the blocks 14 to further aid in absorbing energy displaced by the impact with the vehicle 10. Likewise, the blocks 14 may act as an energy absorber. The blocks 14 may be formed from an energy absorbing material capable of receiving the energy of an impact.

Figure 5:
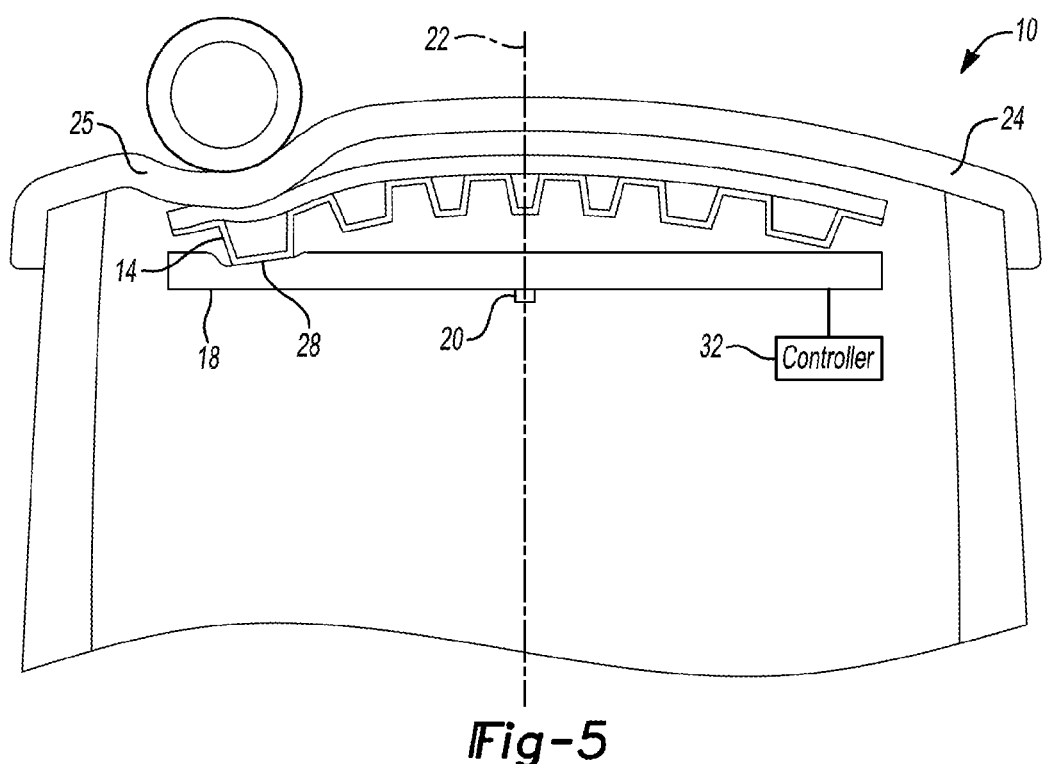

Referring to FIG. 5, a perspective view of an impact with a second side 25 of the fascia 12 is shown. In order for the blocks 14 to indent the pressure tube 18 as described above, the distribution of the blocks 14 across the fascia 12 may be continuous. Further, the blocks 14 may be evenly distributed across the fascia 12 of the vehicle 10. The block distribution on a first side 24 of the fascia 12 may complement the block distribution on a second side 25 of the fascia 12. This allows for the change in volume in the pressure tube 18 to be uniform across the entire fascia 12 of the vehicle 10. The uniformity of the block distribution allows the impact force to be evenly distributed across the blocks 14.

The blocks 14 may have a variety of different shapes with a variety of different geometric ratios. For example, the blocks 14 may be small, thin, and numerous, continuously formed along the curvature of the fascia 12. The blocks 14 may be more numerous toward the center 22 of the vehicle 10. This is due to the center 22 of the vehicle 10 being a high force impact location. As stated previously, the blocks 14 may have a smaller contact area 28 at the center 22 of the vehicle 10. This may allow for more blocks 14 disposed at the center 22 of the vehicle 10. Likewise, the number of blocks 14 may decline as the blocks 14 move away from the center 22 of the vehicle 10.

The fine nature of the blocks 14 allows for a more accurate pressure reading from the pressure sensor 20 of the change in volume in the pressure tube 18. After an impact has occurred, the fine nature of the blocks 14 and the even distribution of the blocks 14 across the fascia 12 allow the blocks 14 to more precisely indicate the magnitude of the impact force.

Utilizing small, fine, and continuous blocks 14 across the fascia 12 may result in a more accurate pressure signal sent from the pressure sensor 20 to the controller 32. The small nature of the blocks 14 minimizes the distance between the blocks 14. Therefore, the entire force component from the impact event is being mapped on the pressure tube 18. Having a more precise map of the magnitude of the force further allows the controller 32 to accurately classify the impact event. More accurately classifying the impact event further aids the controller deployment control logic determination. This enables the protection algorithm to further discriminate between deployment events using a single pressure sensor 20.

The blocks 14 may be mounted to the back of the fascia 12. This may include mechanically fastening the blocks 14 with, for example, rivets or screws. The blocks 14 may also be mounted to the fascia 12 through bonding techniques, such as adhesive bonding or gluing. Further, the blocks may be joined to the fascia 12, such as, through ultrasonic welding. In a further embodiment, the blocks 14 may be formed as part of the fascia 12, or molded directly to the fascia 12.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a bumper structure including a fascia, a beam, a sensor disposed between the fascia and beam and defining a pressure cavity along the fascia, and a plurality of pushers disposed between the fascia and sensor, wherein the pushers are configured such that, for a given vehicle speed, an impact with the bumper structure near a center of the fascia causes a pressure increase within the pressure cavity approximately equal to an impact with the bumper structure near an end of the fascia, and wherein the pushers positioned near a center of the fascia each define a contact area different than the pushers positioned away from the center of the fascia.

2. The vehicle of claim 1, wherein the pushers positioned near the center of the fascia each define a contact area smaller than the pushers positioned away from the center of the fascia.

3. The vehicle of claim 1, wherein the pushers are evenly distributed along the fascia.

4. The vehicle of claim 1, wherein the pushers are attached with the fascia.

5. The vehicle of claim 1, wherein the plurality of pushers is configured to absorb energy associated with the impact.

6. A vehicle comprising:
a fascia;
a bumper beam;
a sensor including a pressure chamber disposed between and along the fascia and bumper beam; and
a plurality of pushers disposed between and along the fascia and bumper beam, and configured to impinge upon the pressure chamber during impact, wherein contact areas defined by the pushers decrease toward a center of the pressure chamber and increase toward ends of the pressure chamber.

7. The vehicle of claim 6, wherein the contact areas are configured such that, during fascia impact at a given vehicle speed, a magnitude of a corresponding impact force near the center of the pressure chamber peaks at approximately a same time as a magnitude of a corresponding impact force near an end of the pressure chamber.

8. The vehicle of claim 6, wherein the contact areas are configured such that, during fascia impact at a given vehicle speed, an impact near the center of the pressure chamber causes a pressure increase within the pressure chamber approximately equal to an impact near an end of the pressure chamber.

9. The vehicle of claim 8 further comprising a controller programmed to classify the impact based on the pressure increase within the pressure chamber.

10. The vehicle of claim 9, wherein the controller is programmed to issue a deployment signal in response to the impact classification being greater than a threshold.

11. A vehicle comprising:
a fascia having a curvature;
a pressure sensor coupled with a chamber disposed behind the fascia; and
a plurality of pushers, having different contact areas, attached along the curvature, wherein the contact areas complement the curvature such that, for a given vehicle speed, an impact near a center of the fascia causes a pressure increase within the chamber approximately equal to an impact near an end of the fascia.

12. The vehicle of claim 11, wherein the pushers are formed continuously along the curvature of the fascia.

13. The vehicle of claim 11, wherein a geometric ratio of the contact areas is such that the pushers are more numerous toward the center than the ends of the fascia.

14. The vehicle of claim 11, wherein the pushers form a substantially rectangular shape.

15. The vehicle of claim 11, wherein the pushers are mechanically fastened to the fascia.

16. The vehicle of claim 11, wherein the pushers are ultrasonically welded to the fascia.

17. The vehicle of claim 11, wherein the pushers are bonded to the fascia.

\* \* \* \* \*